United States Patent

Spooner et al.

[15] 3,658,310
[45] Apr. 25, 1972

[54] FURNACES

[72] Inventors: James Alfred Spooner, Reading; Robin Harold James, Burghfield, both of England

[73] Assignee: United Kingdom Atomic Energy Authority, London, England

[22] Filed: Mar. 4, 1970

[21] Appl. No.: 16,357

[52] U.S. Cl. ................................ 266/24, 266/29
[51] Int. Cl. ........................................... C21b 7/00
[58] Field of Search .................. 266/24, 39; 13/20, 31, 33; 75/84, 84.1

[56] References Cited

UNITED STATES PATENTS

| | | | |
|---|---|---|---|
| 2,729,542 | 1/1956 | Van Der Pyl | 13/20 |
| 3,025,156 | 3/1962 | Humbert et al. | 266/24 |
| 3,290,738 | 12/1966 | Klima et al. | 266/24 |
| 2,491,210 | 12/1949 | Rennie | 266/24 |
| 3,414,661 | 12/1968 | Reed | 266/24 |

*Primary Examiner*—Gerald A. Dost
*Attorney*—Larson, Taylor and Hinds

[57] ABSTRACT

A furnace has a series of interfitting crucibles extending between and through the apertures of first and second guide means mounted in spaced apart relation and adapted to locate the series, the series being arranged such that an open end of a crucible is in interfitting engagement with a base of an adjacent crucible, and includes means for introducing the crucibles through the aperture of the first guide means and for moving the crucibles therefrom into and through the aperture of the second guide means, means for withdrawing the crucibles emergent therethrough and further means for heating at least a portion of the crucible series located between the first and second guide means, the crucible base having at least one hole therethrough and interfitting with the open end of another crucible such that the series so formed constitutes a substantially closed duct. A heatable conduit can extend between the first and second guide means such that the crucibles pass therethrough and the heatable conduit can be fabricated from electrical resistor material. It is preferred that a portion of the conduit is in the form of a helix to thereby provide a resistor element.

12 Claims, 2 Drawing Figures

PATENTED APR 25 1972

3,658,310

FURNACES

BACKGROUND OF THE INVENTION

This invention relates to furnaces for performing heat-activated reactions and has one application in furnaces for heat-activating at least one solid constituent in reactions including at least one gaseous constituent.

Boat-train furnaces in which one or more solid constituents, contained in boat-shaped crucibles, are moved slowly and horizontally through a heated refractory tube are widely used. In heat-activated reactions including at least one gaseous constituent, either as reactant-gas or product-gas or both, it is desirable that the gaseous constituents diffuse readily to and from the bulk of the solid constituent(s) contained in the crucibles thereby restricting the depth of the solid material contained in boat-shaped crucibles to that provided by relatively shallow crucibles: in addition the need to provide crucibles which can be readily filled and emptied also requires the use of shallow boat-shaped crucibles in tubular horizontal furnaces. The restriction on the volume rate at which the constituent(s) can be processed in boat-shaped crucibles signifies that the crucible design fails to provide a container for efficient loading of the available hot zone space of the heated tube, particularly in reactions involving gaseous constituents.

In heat-activated reversible reactions evolving a gaseous product, the sustained presence of which hinders the forward reaction rate, it is desirable, though not always essential, to remove this product from the reactant mass as it is generated by purging with an inert gas. Thus when a solid oxide is reduced by carbon, intimately mixed with the oxide, the forward reaction rate is enhanced if the partial pressure of the back-reacting product gas—oxide(s) of carbon—is reduced in the immediate vicinity of the solid mix by continuous inert gas purging. Inert gas purging is a widely used technique and a technique best exploited by arranging for the inert gas to flow counter-current to the reactant mass. However, for the most efficient use of the furnace hot zone space and the most economic use of the inert gas it is essential to have intimate contact between the whole bulk of the reactant mass and the purge gas.

Likewise, in gas-consuming reactions it is generally desirable that the whole bulk of the solid constituent(s) be brought into intimate contact with the reactant gas, in reactions that are also suitably exploited by counter-current operation. Boat-train furnaces used for the above reactions have the disadvantage that most of the purge or reactant gas streams over the surface of the solid constituent(s) contained in the boat-shaped crucibles and that contact with the bulk of the solid constituent(s) depends on diffusion.

It is an object of the present invention to provide an improved furnace for heat-activating at least one solid constituent in reactions including at least one gaseous constituent whereby loading of the hot zone space is substantially improved. A further object is to provide a furnace whereby contact between the whole bulk of said solid constituent and an inert purge gas and/or reactant gas is substantially improved.

SUMMARY OF THE INVENTION

According to the present invention a furnace comprises a plurality of crucibles moveable in end-to-end abutting relationship through a heatable zone, each crucible having apertured ends, whereby said plurality of abutting crucibles forms a substantially closed duct. Means may be provided for passing a gas through the duct so formed. The furnace may include guide means said abutting crucibles being arranged to be slidably moveable thereover. Preferably the duct is aligned substantially vertically.

The abutting ends of said crucibles may be adapted to engage one another in a manner to prevent relative movement normal to the axis of the duct which they form. For this purpose, and to improve the sealing of the duct, one end of each crucible may be provided with a projection surrounding the aperture, the other end having a recess surrounding the aperture and dimensioned to receive the projection in an abutting crucible. Preferably said projection and recess are frusto-conical.

The aperture at the projection end of each crucible may be formed by a plurality of small holes, and the aperture at the recess end by a single large hole. This arrangement facilitates insertion and retention of material within the crucibles, e.g., pellets, larger than the small holes, when the duct is aligned with the recessed ends uppermost.

The guide means may be located beyond opposite ends of the heatable zone and have apertures dimensioned to locate crucibles passing therethrough. Said guide means may have a heatable heat-resisting conduit located therebetween, the arrangement being such that crucibles introduced through the aperture of one guide means pass through the conduit before emerging through the aperture of the other guide means.

For a substantially vertical duct it is preferred to introduce the crucibles through the aperture of the lower guide means ans lift the crucibles from the lower guide means into and through the aperture of the upper guide means. Preferably the means for passing a gas through the vertical duct includes a gas inlet located beyond the upper guide means whereby the gas flows through the crucibles in a direction opposite to that of the moveable crucibles.

The heatable conduit may be fabricated from electrical resistor material, heatable by the passage of electric current therethrough, and, preferably, is of graphite. Preferably the conduit includes a portion fabricated in the form of a helix to provide a resistor element: preferably the helical resistor is a central portion of said conduit.

Preferably the furnace further comprises a heat-insulating jacket surrounding the heatable conduit. Preferably the furnace is constructed such that the heat-insulating jacket is gas-tight and the ends of the conduit are gas-sealed to said one and other guide means and to the jacket, the crucibles entering and emerging from the apertures of said guide means through gas-tight seals located in said guide means, said gas inlet entering a sealable crucible-withdrawal enclosure adjoining and sealed to said other guide means. Preferably the heat-insulating jacket is provided with a sealable gas inlet and outlet for admitting purge and/or reactant gas to purge the jacket of air.

DESCRIPTION OF THE DRAWINGS

The nature of the present invention may be further explained by reference to the accompanying drawings wherein.

DESCRIPTION OF THE PREFERRED EMBODIMENT

Figures 1, 2:
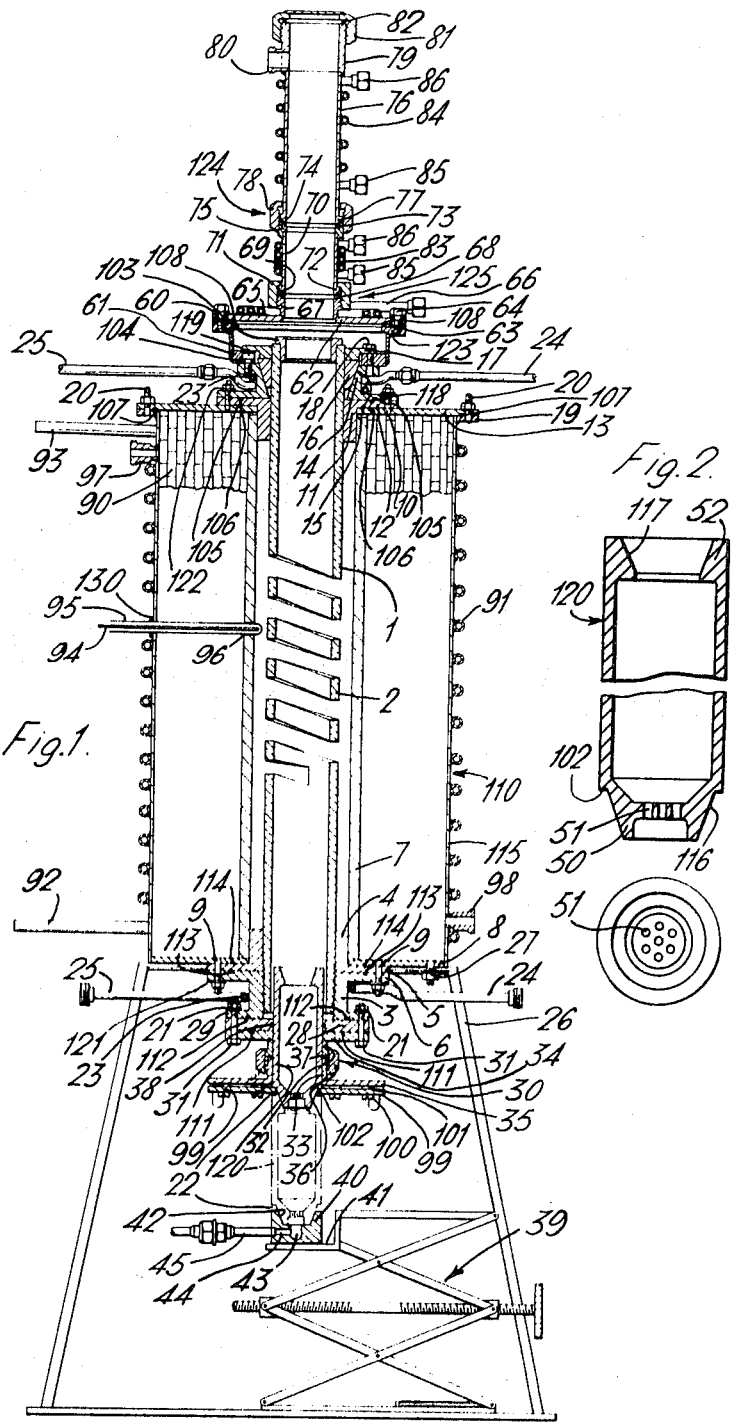
FIG. 1 is a sectional elevation of one furnace embodiment according to the invention.
FIG. 2 is a sectional view of a crucible used in the furnace of FIG. 1.

A heat-resisting conduit 1 consists of a graphite tube, mounted in an upright position, having a middle portion machined to form a helical electrical resistor 2 and providing a heatable zone, heated by the passage of electric current through the resistor. Referring to FIG. 1, guide means over which abutting crucibles are slidably movable consist of lower guide means comprising a sealing unit 30 and an insulator plate 28, and upper guide means comprising sealing units 124 and 125, as hereafter described. The construction of the apparatus at the lower end of the tube 1 is as follows. The graphite tube 1 has a screw thread machined on its outer surface engaging with the threaded bore of a flanged copper collar 3. The collar 3 serves as an electrical power terminal and as a constructional component for registering the position of tube 1 in relation to the other principal structural components. An insulating collar 4 is mounted on the collar 3: the insulating collar 4, e.g., of pyrophyllite has a flange 5 in contact with a flange 6 of the collar 3. An alumina tube 7 with a stainless steel annular plate 8 flush with the lower end thereof and mounted at right-angles thereto is supported by the collar 4 the plate 8, collar 4 and collar 3 being held together by studs 9 located at regular intervals around the annular plate 8: the studs 9 are welded to the plate 8 and are insulated from the flange 6 by Sindanyo collets 121 consisting of flanged collars (the flange only being shown in FIG. 1), the collar section of which extends through flange 6.

A stainless steel shell 115 fits over and is welded to the circular edge of the plate 8, the space between the shell 115 and the tube 7 being filled with heat insulating material 90 to form a heat insulating jacket 110 surrounding the tube 1. A suitable heat insulating material is alumina brick and this is packed within the cylindrical shell 115.

The alumina tube 7 and shell 115 are coaxial with the tube 1 and extend to the upper end thereof. The construction of the apparatus at the upper end is as follows. An insulating collar 11, e.g., of pyrophyllite, fits around the tube 1 the flange 12 of the collar resting on a stainless steel annular plate 13 nominally abutting the upper end of the tube 7, in the same manner as the plate 8 abuts the lower end of tube 7, except that a small expansion gap is allowed. A flanged copper collar 14 having a tapered bore 15 rests on the collar 11 the minimum bore measurement exceeding the outer diameter of tube 1: a tapered copper split-collet 16 fits between the tube 1 and the tapered bore 15, rigid registration of the collet with the tube 1 and collar 14 being achieved with a brass collet-pressure plate 17, pressure being applied by a series of bolts 18 engaging with flanged copper collar 14 through an annular flange 61 (see below) secured to collar 14 by counter-sunk bolts 119. The plate 13, collar 11 and collar 14 are held together by studs 10 spaced around the cylindrical assembly: the studs 10 are welded to the plate 13 and are insulated from the collet 14 by Sindanyo collets 122 consisting of flanged collars (the flange only being shown in FIG. 1), the collar section of which extends through flange 118 of collar 14. The shell 115 has an upper flange 19 welded to it which flange is in contact with plate 13 to which it is secured by studs 20.

Electrical power leads are connected to collars 3 and 14 at the bottom and top of the upright assembly (connections not shown) and water cooling of collars 3 and 14 is provided by copper cooling coils 23, pipes 24 and 25 being for the water inlets and outlets respectively: pipes 24 and 25 are sheathed for electrical insulation and are also insulated from the supply and drainage lines. The basic structure, as now described, is mounted on a tripod stand 26 and secured thereto by studs 27.

In FIG. 2 the constructional features of a crucible according to the invention are shown. The parallel-sided refractory crucible 120, e.g., of graphite, has a base 50 the outer surface 116 of which has the shape of an inverted cone frustum: a series of equi-spaced holes 51 are formed in the base or end 50. The crucible has an upper flange 52 the inner surface 117 of which is shaped to match the surface 116 of the base 50 so that a series of abutting crucibles can be formed by interfitting assembly whereby the series so formed constitutes a substantially closed duct. The cone surfaces 116 and 117 are machined so that the sides of interfitted crucibles do not form a continuous surface but leave a small gap 22 (see FIG. 1). The principal dimensions of the crucible, drawn to scale, are as follows:

Overall height 6 ins, internal diameter 1¾ ins, external diameter 2 3/16 ins, depth of base seven-eighths ins, depth of upper flange three-fourths ins, seven holes (51) each of one-eighth ins dia. with six equi-spaced on a ½ ins dia. circle around one hole concentric with the circle center.

The further structural features at the lower end of the apparatus can now be described. A Sindanyo insulator plate 28 is mounted in contact with the lower flange 29 of the collar 3 and a sealing unit 30 is bolted to the collar 3 through plate 28 by bolts 31: the bolts 31 are insulated from the collar 3 by Sindanyo collets 21 consisting of flanged collars (the flange only being shown in FIG. 1) the collar section of which extends through flange 29. The sealing unit comprises mild steel collars 32 and 33 having flanges 34, 35 respectively, the two collars being coupled by a coupling nut 36: the coupling nut exerts adjustable pressure on a O-ring seal 37 to effect a gas-seal with the side of a crucible 120. A further O-ring seal 38 effects a gas seal between the Sindanyo plate 28 and the crucible. The height of the stand 26 is such as to allow means for introducing the crucibles 120 into the lower end of the tube 1. The means comprises a lever-jack 39: an exhaust member in the form of a short mild steel pedestal 40 stands on the jack platform 41 for supporting each crucible 120, in turn, as it is loaded into tube 1, the pedestal 40 having a recess 42 into which the base 50 (see FIG. 2) of each crucible fits. The pedestal 40 has a central duct 43 with a side duct 44 extending therefrom to which a gas flow pipe 45 is connected, the central duct 43 being opposite the holes 51 formed in the crucible base 50. The gap 22 separating the sides of interfitted crucibles is also present where a crucible fits into the pedestal 40.

The further structural features at the upper end of the apparatus are as follows. The means for withdrawing crucibles at the upper end and an inlet for admitting purge gas are mounted on a short brass cylinder 60: the cylinder has the aforementioned brass annular flange 61 brazed thereto the flange being bolted to collar 14 by the recessed bolts 119. An annular brass plate 62 is mounted over, but insulated from, cylinder 60: the plate is insulated from cylinder 60 by a Sindanyo ring 63 which also incorporates an insulating sleeve around each of the securing bolts 64; the bolts 64 being located at regular intervals around the periphery of the plate 62 and engaging with a flange 123 brazed to cylinder 60. Water-cooling copper coils 65 are brazed onto the upper surface of plate 62 cooling water being supplied through an inlet tube 66 and withdrawn through an outlet tube (not shown). Sealing units 124 and 125 incorporating seals 73 and 68 are constructed as follows. A brass collar 67 is brazed to annular plate 62 and has an O-ring seal 68 located in a recess 69: a brass cylinder 70 is supported on collar 67, a lower flange 72 of the cylinder mating with the recess 69, the cylinder being coupled to the collar 67 with a coupling nut 71, the coupling nut exerting adjustable pressure on the O-ring to effect a gas-seal with the side of a crucible emerging from the tube 1. A further O-ring seal 73 is located in a recess 74 of a flange collar 75 brazed to the upper end of cylinder 70: a brass cylinder 76 is supported on collar 75, a lower flange 77 of the cylinder mating with the recess 74, the cylinder being coupled to the flange collar 75 with a coupling nut 78, the coupling nut exerting adjustable pressure on the O-ring to effect a further gas seal with the side of a crucible. The cylinder 76 is brazed to thicker walled brass cylinder 79 having an inlet 80 for admitting purge and/or reactant gas: the upper end of cylinder 79 is closed by a screw-cap 81, an effective gas seal being ensured by O-ring 82. Cylinders 70 and 76 are cooled by water-cooling copper coils 83 and 84, 85 and 86 being the water inlets and outlets respectively, the cooling coils being brazed to the cylinders. Water-cooling coils 65, 83, and 84 aid the cooling of crucibles emerging from the tube 1 and reduce the heat exposure of the O-rings 68 and 73.

The graphite tube 1 is heat-insulated by an insulating jacket comprising insulating brickwork 90 constructed between the alumina tube 7 and stainless steel shell 115, and the shell 115 is water-cooled with cooling coils 91, water being admitted via tube 92 and withdrawn through the tube 93. The temperature in the vicinity of the electrical resistor 2 is measured by a thermocouple 94 located in an alumina sheath 95, the sheath passing through a gas-tight union 130 joined to the shell 115 and protruding through an orifice 96 in alumina tube 7. Inert and/or reactant gas can be admitted to jacket 110 through shell 115 via inlet 97 to flow out via outlet 98, the purpose of this gas flow being to purge the apparatus of air: valves in inlet 97 and outlet 98 (not shown) are closed when purging is completed. A pressure balance is established within the apparatus ie the pressure within the crucibles 120 equates with that in the insulating jacket 110 (see below).

The weld joining the stainless steel shell 115 to annular plate 8 is gas-tight and a gasket seal 107 effects a gas seal between flange 19 and annular plate 13, so that shell 115 of the heat-insulating jacket 110 is gas-tight. As aforedescribed the crucibles 120 enter and emerge from the apparatus through gasitight seals, further seals being provided to ensure that gas-tight sealing extends between the shell 115 and the outer sides of each entering and emerging crucible. At the upper end of the apparatus seals are provided at each mechanical joint, these seals being 104, 105, 106, and 108. At the lower end of the apparatus seals are likewise provided at the mechanical joints, these seals being 111, 112, 113, and 114.

FIG. 1 is a scale drawing the principal dimensions being approximately as follows:

| | |
|---|---|
| Length of tube 1 | = 29 ins |
| Internal bore of tube 1 | = 2½ ins dia. |
| External dia. of crucible | = 2 three-sixteenth ins |
| Dia. of casing (shell 115) | = 13½ ins |
| Height of casing | = 24 ins |

In operation with power leads connected to collars 3 and 14 the helical electrical resistor 2 is heated to develop a temperature within the helix in excess of the required reaction temperature: the temperature in the region of the helix is measured by the thermocouple 94. A heat-activated solid constituent or mixture of constituents evolving a gaseous product and/or consuming a gaseous reactant is loaded into a series of crucibles 120 and these are introduced into the lower end of the tube 1 by operating the lever-jack 39. While a crucible is being introduced key-plates 99, slidable over studs heads 100, are retracted to allow unimpeded entry of the crucible through the coupling seal (seal 37) and plate seal (seal 38): key-plates 98 have elongated slots (not shown) to allow lateral movement over the studs heads 100, studs 101 extending downwards from the underside of flange 35. After entry of a crucible key-plates 99 are moved inwardly into the gap 22 to support the crucible column by engaging a shoulder 102 formed on each crucible: the lever-jack 39 may then be retracted and a further crucible positioned on the pedestal 40. Crucibles are introduced into and passed through the tube 1 at a rate determined by manual operation of the jack 39. It will be apparent that the jacking action can readily be mechanized to provide a controlled and constant rate of flow of crucibles through tube 1, by providing a motorized jack arrangement. On leaving tube 1 a crucible passes through a flanged insulator distance insert 103 which serves to prevent any contact between the crucibles and the electrically conducting tube, the insert 103, e.g., a pyrophyllite insert, fitting into the end of tube 1. On emerging from tube 1 each crucible passes through the collar seal (seal 68) and the upper coupling seal (seal 73) before entering a sealable enclosure comprising cylinders 76 and 79 for withdrawal. The gas seals 68, 73 are engaging the next lower crucible before the sealing cap 81 is removed to withdraw a crucible holding the reaction product.

In one motorised jack arrangement the series of interfitting crucibles can be lifted through the furnace at a controlled rate with a motor driven jack the jacking mechanism being coupled to an electric motor drive through a worm and wormwheel mechanism. When the jack has reached a point in its stroke where it has lifted the lower-most crucible such that the key-plates 99 can be moved inwards to engage crucible shoulder 102 a switch is opened by a cam to stop the motor: the key-plates are connected to an operating lever (not shown in FIG. 1) and conveniently they can be spring-loaded or otherwise kept in the shoulder-engaging position by engaging a latch with the lever. With the key-plates supporting the crucibles extending through the furnace the jack is manually lowered and the next crucible is then positioned on pedestal 40 this crucible then being manually jacked into interfitting engagement with the previously introduced crucible. The key plates are then retracted the motion being used to operate an interlock switch which re-engages the motor drive. For the reaction described hereafter a suitable lifting speed was found to be 4 ins/hr.

Inert gas and/or reactant gas is admitted through inlet 80 and percolates downwards through the solid constituent(s) contained in the crucibles 120. In reactions where a gaseous product is evolved this product joins and flows with the gas stream.

The gas pressure within the apparatus is maintained positive with respect to ambient pressure, e.g., a pressure of ≈3 psi, is maintained: this prevents the ingress of the surrounding gaseous environment. Moreover, as stated previously, a pressure balance is maintained within the apparatus the positive pressure being borne by the shell 115. To maintain the apparatus pressure-tight for a continuous flow of crucibles therethrough, two seals are provided at each end of the apparatus ie seals 37, 38 at the lower end and seals 68, 73 at the upper end: twin seals at each end provide sealing for a moving discontinuous sealing surface, i.e., the sides of the crucibles separated by gaps 22. The seals 37, 38 and 68, 73 curtail the flow of gas around the outside of the crucibles. By keeping the shell 115 gas-tight by the use of O-ring seals between the mechanical joints the loss of gas from the crucible column between the cone surfaces 116 and 117 and through the walls of graphite crucibles is prevented.

When a crucible has been introduced into the lower end of tube 1 and is supported by key-plates 99 the jack, as aforedescribed, is lowered for locating a further crucible thereon: during this locating, and jacking into contact with the crucible already introduced, the gas stream issuing from the first-mentioned crucible vents to atmosphere. This venting can be tolerated for the few seconds required for locating the further crucible on pedestal 40 and jacking it into interfitting contact with the base of the first-mentioned crucible. During crucible withdrawal, with cap 81 removed, the purge and/or reactant gas entering through inlet 80 vents to atmosphere (at lower pressure) through the open end of cylinder 79: again this can be tolerated for the time interval required for crucible withdrawal and resealing. In reactions where this cannot be tolerated either because of the nature of the gas stream or because of the ingress of air to the cylinder 76, and to the product-containing crucible therein, it is convenient to isolate the gas supply eg by a valve and/or to enclose the whole apparatus in an inert atmosphere.

A typical heat-activated reaction evolving a gaseous product for processing in the apparatus of the present invention comprises plutonium or uranium oxide, or a mixture thereof, admixed with a calculated amount of carbon to produce, for example, the monocarbide; the carbon serving to reduce the oxide compound(s) and form carbide, or mixed carbides, with the evolution of carbon monoxide: the oxide-carbon mixture is generally pre-compacted into pellets, e.g., ¼ × ¼ ins dia. cylinders. Carbon monoxide can be purged from the reacting mixture by, for example, argon, the argon being admitted through inlet 80 and entering the crucible in or entering the cylinder 76 to pass through the series of crucibles via the holes 51. Initially the argon is in contact with carbide product but as it percolates downwards through the reaction mixture contained in successively lower crucibles it is progressively diluted by the carbon monoxide being evolved by the reacting mixture: the argon containing the carbon monoxide passes from the lowermost crucible through ducts 43 and 44 of the pedestal 40 and into and through gas flow pipe 45. For effecting the conversion of plutonium and/or uranium oxide to carbide the power supply to graphite tube 1 is ≈9 kW (e.g., 600 amps at 15 volts) this power generating a temperature of 1,900° C within the helical resistor 2: a temperature gradient extends along the tube 1 from the helical resistor 2 in the upward and downward directions towards the water-cooled copper collars 14 and 3 respectively. The conversion reaction is initiated as crucibles move towards the hot zone of the helical resistor, and is completed after passage through the hot zone, subsequent to which the crucibles cool down before emergence from tube 1 for withdrawal from cylinder 76. As the carbide product of the present example reacts with air it is convenient to enclose the whole apparatus in an inert gas environment.

The aforedescribed apparatus embodiment has an inlet for admitting purge and/or reactant gas, and for a heat-activated reaction evolving a gaseous product eg the typical reaction described, it is desirable to remove the gaseous product from the reactant mass as it is generated by purging with an inert gas. However a gas inlet for admitting purge gas is not necessarily an essential feature of apparatus for performing such reactions and it will be apparent that a series of abutting crucibles constructed according to the invention provide a passage for the escape of the gaseous product of reaction with or without gas purging.

The apparatus of the present invention can be used for performing heat-activated reactions which are principally, although not exclusively, summarized by the following expressions $A + B \rightarrow C + D\uparrow$  1.
$A \rightarrow C + D\uparrow$  2.
$A + B\downarrow \rightarrow C$  3.
$A + B\downarrow \rightarrow C + D\uparrow$  4.
$A + B\downarrow \rightarrow A + B\uparrow$  5.

where $D\uparrow$ or $B\uparrow$ indicates gas evolved and $B\downarrow$ indicates gas consumed.

Examples are for expression 1. The aforedescribed oxide → carbide conversion for expression 2. $U_2N_3 \rightarrow 2\,UN + \tfrac{1}{2}\,N_2$ for expression 3. $2\,UN + \tfrac{1}{2}\,N_2 \rightarrow U_2N_3$ for expression 4. $UC_2 + 2H_2 \rightarrow UC + CH_4$ for expression 5. Physical reactions, e.g., surface area adjustment of powder and sintering in controlled atmospheres.

We claim:

1. A furnace comprising a plurality of crucibles movable in end-to-end abutting relationship through a heatable zone, each crucible having apertured ends, whereby said plurality of abutting crucibles forms a substantially closed duct, and means for passing a gas through said duct.

2. A furnace comprising a movable series of interfitting crucibles extending between and through first and second apertured guide means mounted in spaced apart relation for locating said series, the series being such that the open end of one crucible is in interfitting relation with the base of an adjoining crucible, means for introducing the crucibles through the first guide means and for moving the crucibles from the first into and through the second guide means, means for withdrawing the crucibles emergent through the second guide means, means for heating at least a portion of said series between said first and second guide means, said crucible base having at least one aperture therethrough and interfitting with the open end of said one crucible such that said series forms a substantially closed duct, and means for passing a gas through said duct.

3. A furnace as claimed in claim 2 wherein said series is aligned substantially vertically and the bases of the crucibles are lowermost.

4. A furnace as claimed in claim 3 wherein the crucible heating means comprises a heatable heat-resisting conduit located between said first and second guide means through which said crucibles pass.

5. A furnace as claimed in claim 4 wherein said conduit is fabricated from electrical resistor material and is heatable by the passage of electric current therethrough.

6. A furnace as claimed in claim 5 wherein said movable series of crucibles is spaced from said conduit so that the crucibles move through the conduit without contact therewith.

7. A furnace as claimed in claim 6 wherein the conduit is at least part-helical thereby forming a resistor element.

8. A furnace as claimed in claim 7 including a gas inlet positioned so that the gas flows through the duct in a direction opposite to that of the moveable crucibles.

9. A furnace as claimed in claim 8 having a heat-insulating jacket surrounding the conduit.

10. A furnace as claimed in claim 9 constructed such that the heat-insulating jacket is gas-tight and the ends of the conduit are gas-sealed to said first and second guide means and to the jacket, the crucibles entering and emerging from said guide means through gas-tight seals located in said guide means, said gas inlet entering a sealable enclosure adjoining and sealed to said second guide means, and said sealable enclosure being such that successive crucibles emergent from said guide means can be removed therefrom.

11. A furnace as claimed in claim 10 wherein means for withdrawing gas from the duct are located beyond said first guide means said withdrawing means comprising an exhaust member dimensioned to engage successively the base projection of each crucible entering the first guide means, said exhaust member having a duct which registers with the aperture through said base.

12. A furnace as claimed in claim 6 wherein, to prevent relative movement of the crucibles of the series normal to the duct axis, the base of each crucible has a projection surrounding the aperture interfitting with a recess surrounding the open end of the adjoining crucible, said projection and recess being frusto-conical.

* * * * *